May 25, 1965 J. A. SHOOK ETAL 3,185,110
FREIGHT BRACING APPARATUS
Filed Aug. 24, 1962 3 Sheets-Sheet 1
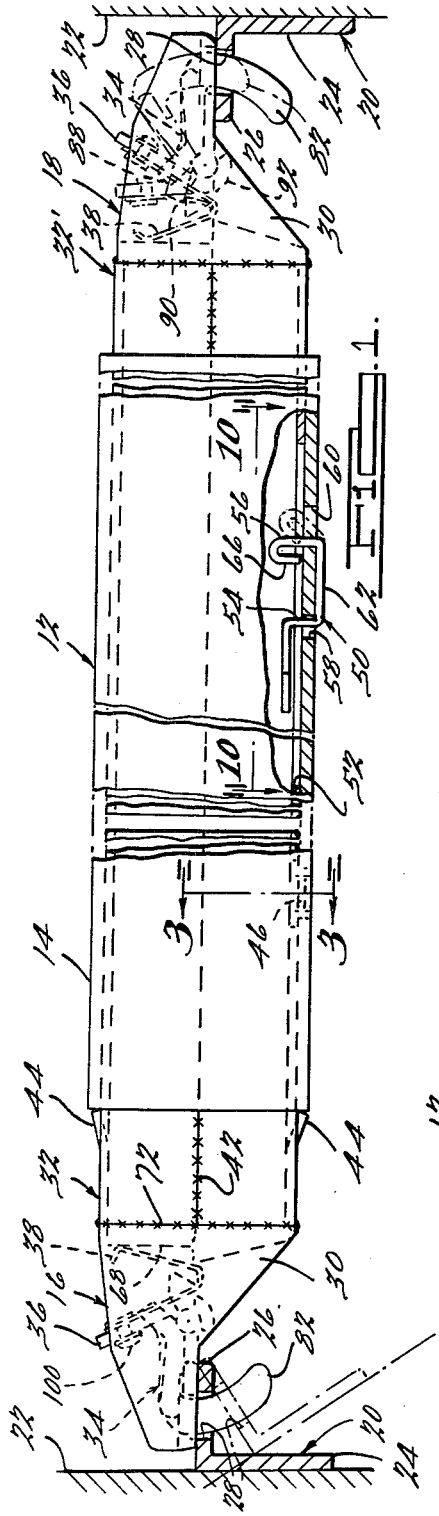
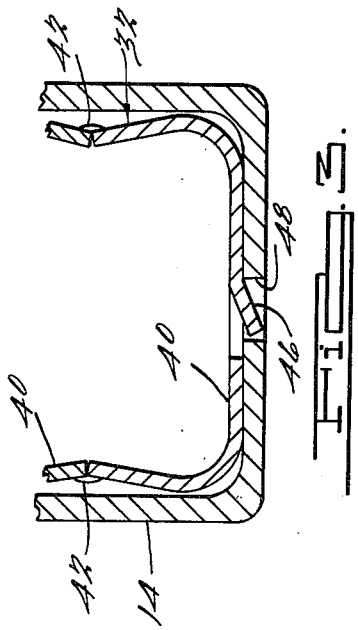
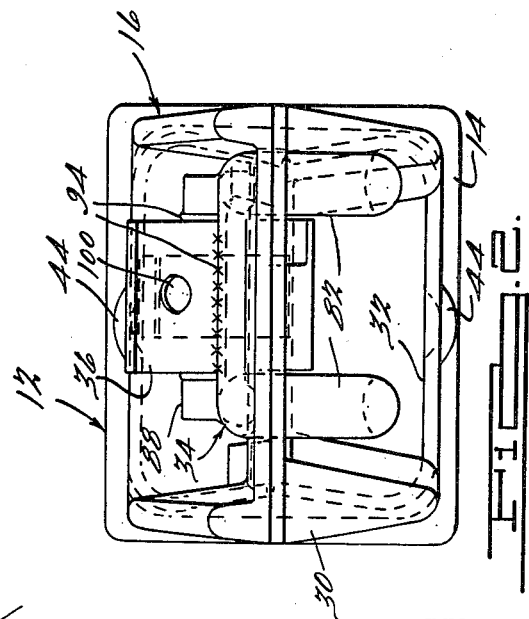
INVENTORS.
Jackson A. Shook.
Herbert E. Rolfe, Jr.
BY
Harness, Dickey & Pierce
ATTORNEYS.

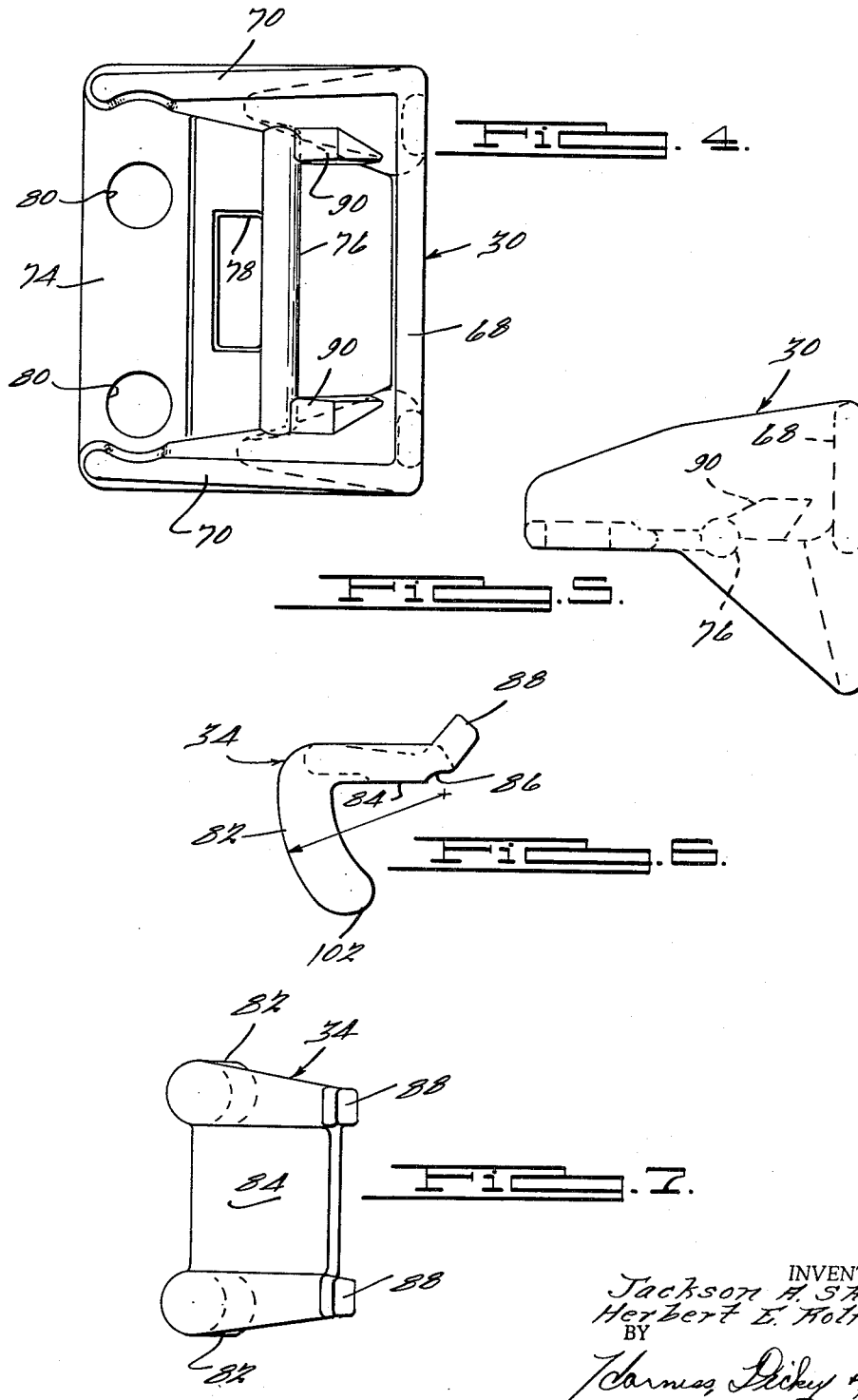

May 25, 1965   J. A. SHOOK ETAL   3,185,110
FREIGHT BRACING APPARATUS
Filed Aug. 24, 1962   3 Sheets-Sheet 3
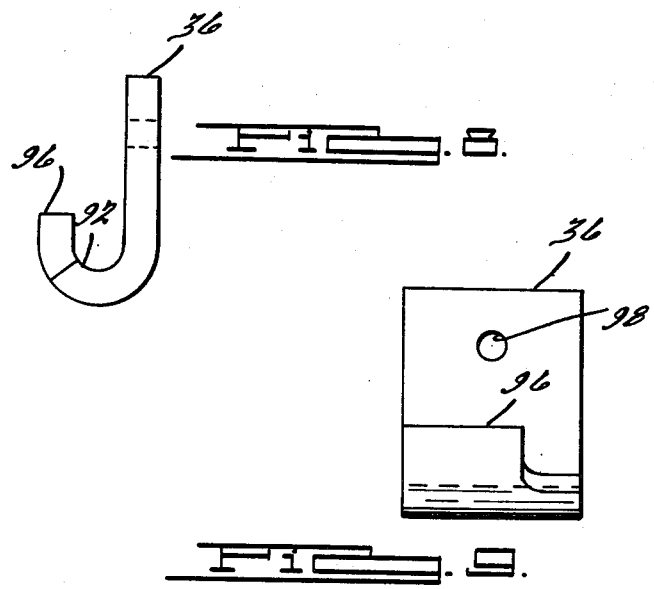
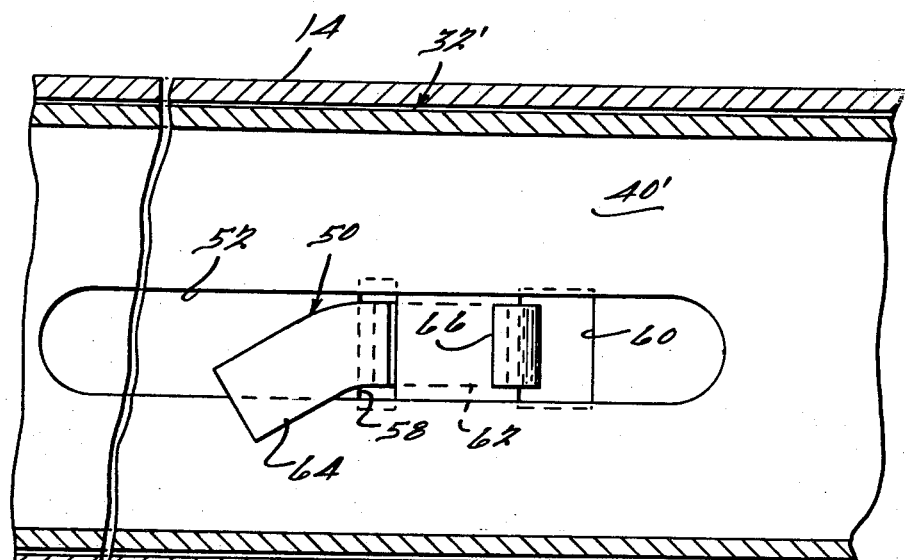
INVENTORS
Jackson A. Shook
Herbert E. Rolfe, Jr.
BY
Barnes, Dickey & Pierce
ATTORNEYS

United States Patent Office 3,185,110
Patented May 25, 1965

3,185,110
FREIGHT BRACING APPARATUS
Jackson A. Shook, Northville, and Herbert E. Rolfe, Jr., Garden City, Mich., assignors to Evans Products Company, Plymouth, Mich., a corporation of Delaware
Filed Aug. 24, 1962, Ser. No. 219,295
14 Claims. (Cl. 105—369)

The present invention relates to freight bracing apparatus and more particularly to an improved freight bracing crossbar adapted for use in supporting and bracing freight in railway freight cars, trucks or other freight receiving chambers having spaced, parallel and generally horizontally extending supports commonly known as belt rails.

It is an object of the present invention to provide an improved freight bracing crossbar which is simple in design, economical of manufacture, and reliable and efficient in operation.

It is also an object of this invention to provide such an improved crossbar which is adapted for either what is known as one-man operation, or what is known as two-man operation.

A further object of the present invention is to provide an improved end fitting for such a crossbar in which the latch is the only movable part of the end fitting and carries the pins integrally formed with the latch.

Another object of this invention is to provide such an improved end fitting having curved latch pins and so constructed that upon movement of the end fitting, tending to raise it from its connection with the belt rail, the belt rail will exert a force on the latch pins holding them in latched position.

Other and more detailed objects of the present invention will be apparent to those skilled in the art from a consideration of the following specification, the appended claims, and the accompanying drawings wherein:

FIGURE 1 is a broken view partially in elevational and partially in section of a crossbar embodying the present invention and showing the opposite ends thereof mounted on belt rails supported on spaced side walls, and showing in broken lines at the left-hand side thereof a position of the belt rail showing a relative position of the belt rail and crossbar end fitting which is passed through during one manner of operation in attaching the end fitting to and disconnecting it from the belt rail and showing in broken lines at the right-hand side thereof the retracted position to which the latch may be moved during another manner of operation in connecting and disconnecting the crossbar end fitting;

FIGURE 2 is an enlarged end elevational view of the crossbar illustrated in FIGURE 1 showing the left-hand end thereof as viewed in FIGURE 1;

FIGURE 3 is a broken enlarged sectional view of the structure illustrated in FIGURE 1 taken substantially along the line 3—3 thereof;

FIGURE 4 is a plan view of the end fitting body;

FIGURE 5 is a side elevational view of the end fitting body illustrated in FIGURE 4;

FIGURE 6 is a side elevational view of the end fitting latch;

FIGURE 7 is a plan view of the end fitting latch illustrated in FIGURE 6;

FIGURE 8 is a side elevational view of the latch handle;

FIGURE 9 is a front elevational view of the latch handle; and

FIGURE 10 is a broken enlarged sectional view of the structure illustrated in FIGURE 1 taken substantially along the line 10—10 thereof.

Referring to the drawings, the crossbar there illustrated is generally designated 12 and comprises a crossbar body 14 and end fittings generally designated 16 and 18 mounted on the opposite ends thereof and adapted to be connected to belt rails 20 mounted on supporting walls represented at 22 which, for example, may be the opposite side walls of a railway boxcar. These supporting belt rails are in the conventional form of angle irons having a vertical flange 24 secured to the wall 22 and a horizontally extending flange 26 having a plurality of vertically opening apertures 28 uniformly spaced longitudinally thereof. These belt rails are the same type belt rails employed in the freight bracing apparatus which the applicants' employer has for many years sold under the trademark DF.

The body 14 of the crossbar 12 in the preferred embodiment illustrated in a tubular aluminum extrusion, although it will be appreciated that, if desired, it may be formed of any other suitable material. The end fitting 16 is mounted in the left-hand end of the crossbar body 14 as viewed in FIGURE 1 and comprises a forged body 30 illustrated in FIGURES 4 and 5, a tubular shank 32 and a latch 34 illustrated in FIGURES 6 and 7 and provided with a latch handle 36 illustrated in FIGURES 8 and 9 and yieldably held in latched position by a spring 38. The end fitting 18 mounted at the opposite end of the bar body differs from the end fitting 16 in that the end fitting 18 is mounted for telescopic movement relative to the bar body 14 as hereinafter described, whereas the end fitting 16 is mounted so as to be held against movement longitudinally of the bar body 14 as hereinafter described. The end fittings 16 and 18 also differ, as hereinafter described, in that one is right-hand and the other is left-hand to provide what is conventionally known as pitch splitting upon end for end reversal of the crossbar, whereby the crossbar may be adjusted along the belt rails a distance less than the spacing between the apertures 28.

Considering first the end fitting 16, the shank 32 thereof is tubular in shape and as best illustrated in FIGURE 3, in the preferred embodiment illustrated, is formed of two generally channel-shaped halves 40, the legs of which abut to form the generally tubular shape of the shank 32 and are welded together throughout the length of the shank by welds indicated at 42. It will be noted that the legs of the channel-shaped shank halves 40 converge slightly so that the welds 42 will be out of engagement with the bar body 14. The shank 32 is held against substantial movement longitudinally of the bar body 14 by a pair of outwardly struck projections 44 at the top and bottom of the shank 32 which engage the outer end of the bar body 14 to prevent movement of the shank 32 inwardly thereof. The end fitting 16 is held against movement outwardly of the bar body 14 by a downwardly turned tab 46 best illustrated in FIGURE 3, which is pressed downwardly from the bottom of the shank 32 into an aperture 48 provided in the bar body 14.

The shank 32' of the end fitting 18, at the opposite end of the bar body 14, is formed of similar channel-shaped halves 40' but is longer than the above described shank 32 to provide for sufficient overlap with the bar body 14 in all positions of telescopic movement of the end fitting 18 relative to the bar body. The shank 32' is connected to the bar body 14 for free telescopic movement between predetermined limits by a clip 50 mounted on the bar body 14 at the under side thereof and extending into an elongated slot 52 in the bottom of the shank 32' and best illustrated in FIGURES 1 and 10. The clip 50 is formed of sheet metal and has a pair of spaced leg portions 54 and 56 which extend through apertures 58 and 60, respectively, in the bar body 14 and through the slot 52 of the shank 32' and which are interconnected by a flat web portion 62 which overlies the outer surface of the bar body 14 between the apertures 58 and 60. The leg 54 has a laterally turned portion 64 which engages the inner surface of the shank 32' to hold the leg 54 against withdrawal from the slot 52 and aperture 58. The leg 56 has a reversely turned end portion 66 which rides in the slot 52 and engages the inner surface of the bar body 54 as shown in FIGURE 1. During assembly, the leg 56 is in the position shown in broken lines in FIGURE 1 and is passed through the aperture 60 and slot 52 after the leg 54 has been inserted through the aperture 58 and slot 52. The leg 56 is then forced to the position shown in full lines in FIGURE 1 and the end portion 66 engages the inner surface of the bar body 14 to prevent withdrawal of the leg 56 through the aperture 60. It will now be seen that engagement of the shank 32' at the right-hand end of the slot 52 with the legs 56 will limit inward movement of the shank 32' and engagement of the shank 32' at the left-hand end of the slot 52 with the leg 54 will limit outward movement of the shank 32' relative to the bar body 14.

The balance of the two end fittings 16 and 18, that is, the parts outward of and carried by the shanks 32 and 32' and sometimes called the heads of the end fittings, are the same except for the above mentioned right-hand, left-hand difference resulting from the incorporation of the conventional end for end reversal pitch splitting feature. The parts of the head of the end fitting 16 are illustrated in FIGURES 4 to 9 and will now be described.

The body 30 is preferably forged in one piece and comprises an attaching plate portion 68 disposed at right angles to the axis of the shank 32 and a pair of spaced longitudinally extending and generally vertically disposed arms 70 extending outwardly from opposite ends of said plate portion 68. The attaching plate portion 68 and the portions of the arms 70 extending therebelow are welded as shown at 72 to the shank 32, both across the top and down the sides. The arms 70 carry a generally centrally disposed transversely extending horizontal plate portion 74, the inner edge of which is spaced outwardly from the attaching plate 68 and is enlarged and rounded as shown at 76 to provide a pivotal mounting for the latch 34. To facilitate this mounting of the latch, the plate 74 has an elongated aperture 78 adjacent the rounded or pin portion 76. Outwardly of the aperture 78 the transverse plate portion 74 is adapted to rest upon the upper surface of the horizontal flange 26 of a belt rail 20 and has a pair of vertically opening apertures 80 spaced for alignment with two of the apertures 28 in the belt rail. In the preferred embodiment the spacing of the apertures 80 is double the spacing of the apertures 28 and it will be noted that they are offset from the centerline to provide the above mentioned pitch splitting. The body 30 of the other end fitting 18 has the corresponding apertures 80 offset the same distance in the opposite direction.

The latch 34 is preferably forged in a unitary piece and comprises a pair of spaced arcuately shaped pins 82 integrally formed with and depending from the outer corners of a generally flat interconnecting web portion 84, and received in the apertures 80. The inner edge of the web portion 84, at the under side thereof is arcuately shaped, as indicated at 86, to fit the curved surface of the pivot pin portion 76 integrally formed on the body 30. The pins 82 are curved about the axis of the surface 86 as shown in FIGURE 6, which is coincident with the axis of the pin portion 76 so that upon pivotal movement of the latch 34 about this axis the pins move in the apertures 80. The latch 34, at the inner corners of the web portion 84, has a pair of ears 88 which extend upwardly and inwardly as shown and which engage stops 90 integrally formed on the arms 70 of the body 30 when the latch 34 is in the retracted position illustrated in broken lines at the right-hand end of FIGURE 1. The parts may be so proportioned that in the retracted position of the latch 34 the lower ends of the pins 82 will occupy any desired position and they could, if desired, be substantially at the lower surface of the body plate portion 74. In the preferred embodiment it will be seen that the lower ends of the pins 82 in the retracted position are below the bottom of the belt rail flange 26. The latch 34 is actuated through a latch handle or lever 36 which also cooperates in mounting the latch on the pin portion 76 of the body. The latch lever 36 is formed of sheet metal of generally rectangular shape with its lower portion reversely bent as best shown in FIGURE 8 to provide a bearing portion 92 adapted to fit over the pivot pin portion 76 of the body 30. The latch lever 36 extends upwardly between the ears 88 on the latch and is welded to the latch as shown at 94. In the end fitting 16, the latch 34 being offset to the right as shown, the latch lever 36 is notched at the right side as best shown in FIGURE 9, leaving an upwardly extending end portion 96 adapted to project upwardly through the aperture 78. It will be appreciated that the latch lever of the other end fitting, 18, is notched at the opposite side. Near its upper end the latch lever 36 has an aperture 98 through which extends a rivet 100 which fastens the spring 38 to the latch lever. The spring 38 is a generally V-shaped leaf spring, one leg of which is fastened to the latch lever 36 by the rivet 100 and the other leg of which engages the adjacent surface of the attaching plate 68. It will thus be seen that the spring 38 urges the latch 34 to its operative position shown in full lines in the drawings.

The crossbar 12 of the present invention, the assembly of which is believed to be apparent from the foregoing description, may be operated either as a two-man bar or as a one-man bar. In what is referred to as a two-man operation, there is a man at each end in disconnecting the end fittings from the belt rails. In this operation each man engages the latch lever 36 and moves it, against the action of the spring 38, to pivot the latch 34 to its unlatched or retracted position. In this position, shown in broken lines at the right-hand end of FIGURE 1, although the latch pins 82 extend downwardly through the apertures 80 of the web portion 74 of the end fitting body 30 and through the aligned apertures 28 of the belt rail 20, the bar may be lifted vertically and the latch pins 80 at each end will be readily withdrawn from the belt rail apertures 28. The bar may be connected to the belt rails in two-man operation by reversing the above described procedure. Also, the end fittings may be connected to the belt rails without manually engaging the latches simply by approximately aligning the pins with the belt rail apertures 28 and forcing the end fitting down vertically sharply. In this operation, if the lower end of the pin 82 hits the belt rail at the side of the hole 28 remote from the wall 22, the latch 34 is pivoted upwardly causing the lower ends of the pins 82 to move toward the wall until they can drop into the hole 28. If, when the lower end of the pin 82 has started into the hole 28, the outer arcuate surface of the pin contacts the belt rail at the side of the hole toward the wall, this will cam the end fitting, if the telescopic one, or the end fitting and bar body if the fixed end fitting, toward the opposite wall. In a preferred embodiment for use with a belt rail in which the apertures 28 are 11/16 inch in diameter, the pins 82 are 9/16 inch in diameter and it will be noticed that they have lower end portions 102 which gradually reduce to a smaller diameter. This pin shape is best illustrated in FIGURE 6. These proportions and shapes facilitate and render very easy this last described method of operation without engaging the latch.

In the one-man operation the worker, while holding the bar at a position remote from one end, preferably the fixed end, hooks the pins 82 into the holes 28 of one belt rail so that the bar assumes generally the position relative to the belt rail which the bar of FIGURE 1 occupies relative to the belt rail shown in broken lines at the left-hand end thereof. The worker then raises the other end of the bar, telescoping the end fitting 18 inwardly to clear the opposite belt rail, and moving the pins 82 of the end fitting 18 into substantial alignment with the belt rail holes 28 and completing the connection either by operating the latch of the end fitting 18 or by simply sharply forcing the bar downwardly as described above. During the raising of the latter end, the fixed end, without any manual operation of the latch 34, will automatically move to the fully connected position relative to the belt rail shown in full lines at the left-hand side of FIGURE 1. By reversing the above described operation, one man, after manually unlatching and disconnecting one end fitting from one of the belt rails, may lower the disconnected bar end until the bar assumes the position relative to the other belt rail which the bar of FIGURE 1 occupies relative to the belt rail shown in broken lines at the left end thereof and then the pins 82 may be unhooked from the belt rail by simply raising that end of the bar.

While only one specific embodiment of the invention has been illustrated and described in detail herein, it will be readily appreciated by those skilled in the art that numerous modifications and changes may be made therein without departing from the spirit and scope of the present invention.

What is claimed is:

1. An end fitting for a crossbar for bracing freight and adapted for connection between a pair of spaced supporting elements mounted on spaced supporting walls at least one of which elements has a substantially horizontally extending flange extending toward the other of said elements and having spaced apertures therein, said end fitting being adapted to be disposed at one end of said crossbar to constitute an end portion thereof and having one end connected thereto and being adapted for connection to said one of said elements, said end fitting comprising a body having an apertured surface adapted to engage the upper surface of said flange to support said end fitting thereon with at least one of the apertures of said apertured surface aligned with at least one of said apertures of said flange, and a latch pivotally mounted on said body and having curved pin means extending downwardly and adapted to extend through said aligned apertures and to extend under said flange for cooperation therewith to limit vertically upward movement of said end fitting relative to said flange, means mounting said latch for pivotal movement about an axis extending transversely of said end fitting and parallel to said apertured surface and spaced from the apertures therein in a direction toward said one end of said end fitting and for movement between an unlatched position in which any portion of said pin means below said apertured surface does not extend under said flange out of vertical alignment with said aligned apertures and in which said end fitting may be raised vertically relative to said flange to disconnect said end fitting from said flange and a latched position in which a portion of said pin means is adapted to extend below said flange and out of vertical alignment with the apertures in said flange through which said pin means extends so that said portion cooperates with said flange to limit vertically upward movement of said end fitting relative to said flange.

2. An end fitting as defined in claim 1 wherein said pin means is curved about a center substantially on said axis.

3. An end fitting as defined in claim 1 wherein said latch is movable between a latched position and a raised retracted position, in both of which said pin means is disposed at one side of said axis and wherein the center of gravity of said latch is at said one side of said axis so that the force of gravity urges said latch toward said latched position.

4. An end fitting as defined in claim 1 wherein said latch is the sole movable part of said end fitting.

5. An end fitting as defined in claim 1 wherein said end fitting body has a horizontally disposed plate portion providing said apertured surface and having an enlarged and rounded rear edge providing an integrally formed pivot pin portion, and means mounting said latch on said pivot pin portion for said pivotal movement between said positions.

6. An end fitting as defined in claim 5 wherein said latch has an arcuate bearing portion engaging said pivot pin portion of said body and wherein said means mounting said latch comprises a latch lever secured to said latch and holding said bearing portion of said latch in engagement with said pivot pin portion, said latch lever extending outwardly for engagement to effect pivotal movement of said latch toward said retracted position.

7. An end fitting as defined in claim 6 including a spring acting between, and mounted on one of, said latch lever and said body and urging said latch to said latched position.

8. An end fitting as defined in claim 1 wherein said end fitting body has a stop portion and said latch has an ear disposed to engage said stop portion to prevent movement of said latch beyond said retracted position in a direction away from said latched position.

9. An end fitting as defined in claim 1 wherein said pin means is of a diameter to be loosely received in said apertures of said belt rail and said pin means has a lower end portion of gradually reducing size whereby said end fitting may be readily connected to said belt rail by only approximately aligning said pin means with said belt rail apertures and sharply forcing said end fitting downwardly against said belt rail.

10. An end fitting for a crossbar for bracing freight and adapted to be connected to and disconnected from a belt rail mounted on a supporting wall structure and having a horizontally extending flange having apertures therealong and to permit such connection and disconnection to be made either with or without any relative movement of the parts of the end fitting, said end fitting having one end adapted to be connected to said crossbar and said end fitting comprising a body adapted to engage and be supported upon the upper surface of said flange, a latch having pin means movable therewith, means mounting said latch on said body for pivotal movement between a latched position and a retracted position about a horizontal axis extending transversely of said end fitting, said pin means being curved in a plane longitudinally of said end fitting and so disposed that when said latch is in said latched position the upper portion of said pin means extends generally vertically for extending through said apertures in said belt rail and said pin means curves downwardly from said upper portion and in a direction toward said one end of said end fitting and out of vertical alignment with said apertures.

11. An end fitting as defined in claim 10 wherein said pin means is curved on a circular arc about a center on said axis.

12. Apparatus for bracing freight comprising a pair of spaced supporting elements, means supporting said elements at corresponding elevations, a crossbar connected between said supporting elements, at least one of said elements having a substantially horizontally extending flange extending toward the other of said elements and having spaced apertures therein, said crossbar having an end fitting at one end thereof removably connecting said one end thereof to said one of said elements, said end fitting comprising a body having an apertured surface engaging the upper surface of said flange to support said end fitting thereon with at least one of the apertures of said apertured surface aligned with at least one of the apertures of said flange, and a latch pivotally mounted on said body and having curved pin means which in latched position extends downwardly through said aligned apertures and curves under said flange and out of vertical alignment with said aligned apertures and cooperating with said flange to limit vertically upward movement of said end fitting relative to said flange, said latch being movable between said latched position and an unlatched position in which the portion of said pin means below said apertured surface does not extend under said flange out of vertical alignment with said aligned apertures and in which said end fitting may be raised vertically relative to said flange to disconnect said end fitting from said flange.

13. Apparatus as defined in claim 12 including means mounting said latch for pivotal movement about an axis disposed transversely of said crossbar parallel to said apertured surface and spaced from the apertures in said apertured surface in a direction toward the remote end of said crossbar.

14. Apparatus as defined in claim 13 wherein said pin means is curved about a center substantially on said axis.

References Cited by the Examiner
UNITED STATES PATENTS

| | | | |
|---|---|---|---|
| 1,370,928 | 3/21 | Swanson | 292—128 |
| 1,885,713 | 11/32 | Hammerly | 292—128 |
| 2,422,723 | 6/47 | Fisher | 292—241 |
| 2,454,690 | 11/48 | Dean | 292—128 |
| 2,575,550 | 11/51 | Fahland. | |
| 2,673,530 | 3/54 | Stough. | |
| 2,879,722 | 3/59 | Dunlap. | |
| 2,982,230 | 5/61 | Chapman. | |
| 3,039,837 | 6/62 | Poe | 292—241 |

LEO QUACKENBUSH, *Primary Examiner.*